United States Patent [19]

Clark, Jr.

[11] 4,268,718
[45] May 19, 1981

[54] HOUSING ACOUSTICAL AMPLIFIER

[75] Inventor: Hamilton Clark, Jr., Orlando, Fla.

[73] Assignee: Harris Corporation, Melbourne, Fla.

[21] Appl. No.: 56,403

[22] Filed: Sep. 5, 1979

[51] Int. Cl.³ .................... H04M 1/00; G10K 11/00
[52] U.S. Cl. .................................. 179/1 E; 181/182; 181/198
[58] Field of Search ............... 179/1 E; 181/182, 185, 181/198, 199

[56] References Cited

U.S. PATENT DOCUMENTS

| | | | |
|---|---|---|---|
| 3,037,081 | 5/1962 | Carlsson | 179/1 E |
| 3,449,519 | 6/1969 | Mowry | 179/1 E |

*Primary Examiner*—Daryl W. Cook
*Attorney, Agent, or Firm*—L. Lawton Rogers, III

[57] ABSTRACT

A portable receiver includes a housing which operates as an acoustical amplifier to increase the output level of the audio signals produced by a sound transducer. The sound transducer is located within a cavity in the housing and emits audio signals into the interior of the housing. The housing has vents located in its walls to permit the audio signals produced by the sound transducer to pass freely to the exterior of the housing. The vents are dimensioned such that the resonant frequency of the housing lies approximately at the center of the frequency range of the signals produced by the sound transducer. Matching the resonant frequency of the housing to the output signals of the transducer causes the housing to operate as a tuned resonator which amplifies the output signals of the transducer.

12 Claims, 4 Drawing Figures

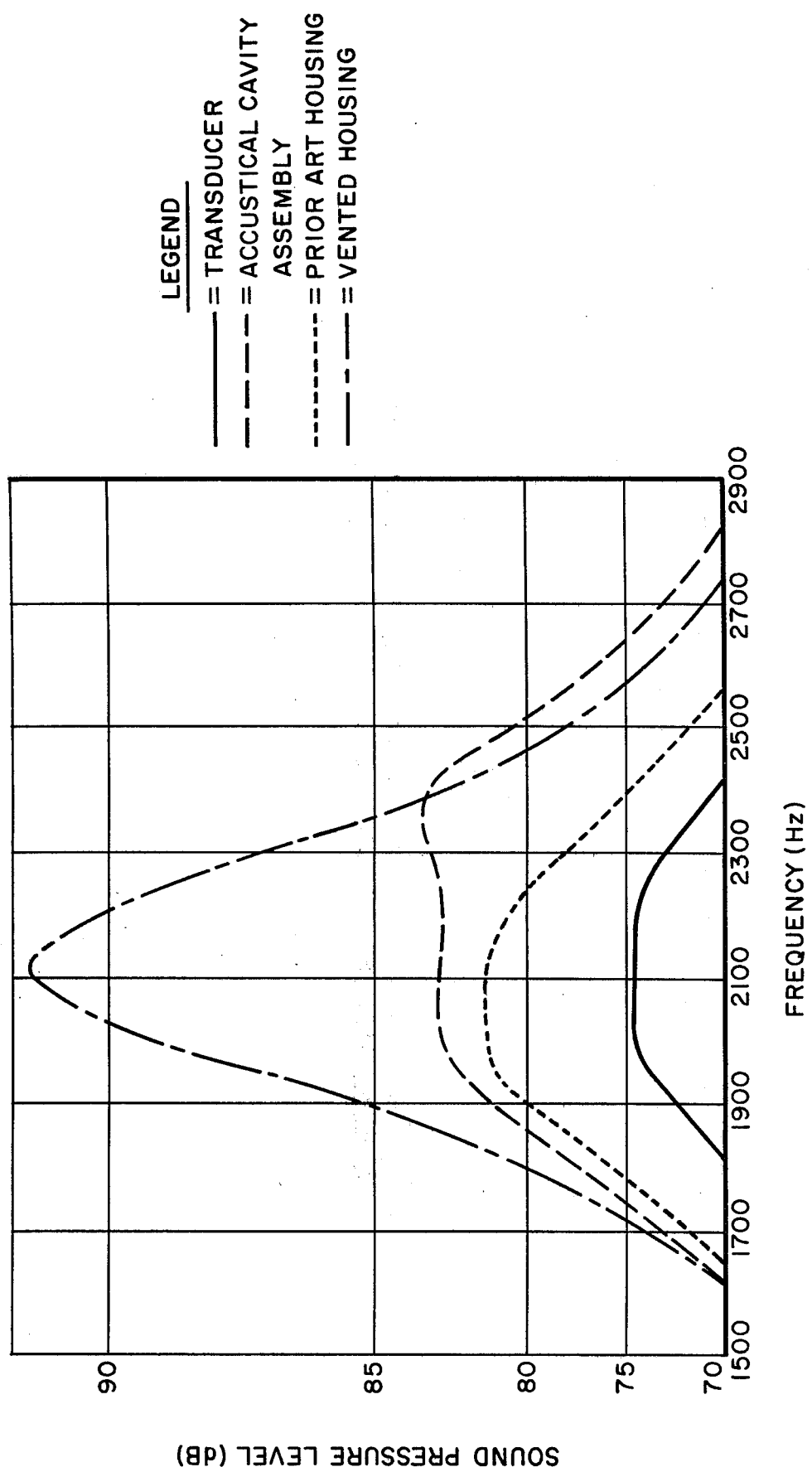

HOUSING ACOUSTICAL AMPLIFIER

BACKGROUND OF THE INVENTION

The present invention relates to an acoustical amplifier for increasing the sound pressure level of an audio signal, and more particularly, to a method and apparatus for amplifying the output signal of a portable receiver without requiring additional electrical power.

Portable receivers, such as pagers and miniature hand-held radios, utilize miniature magnetic transducers as sound output devices. Conventionally, these transducers are located in acoustical cavities within the housing of the receiver, and the audio signals produced by the transducer are conducted to the exterior of the housing by means of a channel leading directly from the output port of the transducer to an output aperture in a wall of the housing.

Typically, the output signal from a portable receiver has a sound pressure level (SPL) in the range of 80–84 decibels. This output level may not be sufficient for easy recognition in a relatively noisy environment. For example, an alerting signal at this output level from a pager beeper may not be adequate to gain the attention of a worker at a construction site.

Portable receivers of the type described previously use a small battery for a power supply. Since such a battery has a limited amount of available power, an increase in the output level of the audio signals produced by the sound transducer through electrical amplification is not a desirable solution to the problem of low level transducer signals. The extra electrical power required to increase the output signal to a satisfactory level may provide an increased drain on the battery power and therefore necessitate more frequent changing of the batteries, which is both bothersome and more expensive.

One proposed solution for amplifying the audio output signal of a portable radio receiver is illustrated in U.S. Pat. No. 3,748,583 issued to Anderson et al. This patent discloses an acoustical horn which is directly coupled to the sound transducer to amplify the output signal thereof. One problem associated with this proposed solution is the increase of the size of the receiver. The acoustical horn requires an extra compartment to be added to the receiver, thereby increasing the size of the receiver considerably. It is desirable to have the portable receiver occupy as little space as necessary, and therefore the solution proposed by this patent is not entirely satisfactory. Furthermore, the acoustical horn requires that additional components be added to a conventional receiver, and therefore inreases manufacturing costs.

OBJECTS OF THE INVENTION

It is therefore an object of the present invention to provide a novel method and apparatus for increasing the sound pressure level of the audio output signal from a sound transducer.

It is another object of the present invention to provide a novel method and apparatus for increasing the output level of an audio signal without requiring electrical power to provide signal amplification.

It is a further object of the present invention to provide a novel method and apparatus for increasing the audio output signal of a receiver without increasing the size or cost of the receiver.

It is yet another object of the present invention to provide a novel method and apparatus for increasing the audio output signal of a receiver without the need for additional components to perform the signal amplification.

It is yet a further object of the present invention to provide a novel method and apparatus for increasing the audio output signal of a receiver which utilizes the housing of the receiver as a tuned resonator for increasing audio signals in a predetermined frequency range.

These as well as other objects and advantages of the present invention will be apparent to one of ordinary skill in the art from a perusal of the following description taken in conjunction with the accompanying drawings.

BRIEF DESCRIPTION OF THE DRAWINGS

FIG. 4 is a graph illustrating the sound pressure level of the output signal of a sound transducer vs. frequency under differing acoustical conditions.

DESCRIPTION

The present invention is disclosed in its preferred embodiment with respect to a portable pager beeper assembly. It will be apparent to those of ordinary skill in the art, however, that the present invention is applicable to a large number of different types of receivers for transforming an information signal, such as a broadcast radio frequency signal, into an audio output signal.

Figure 1:
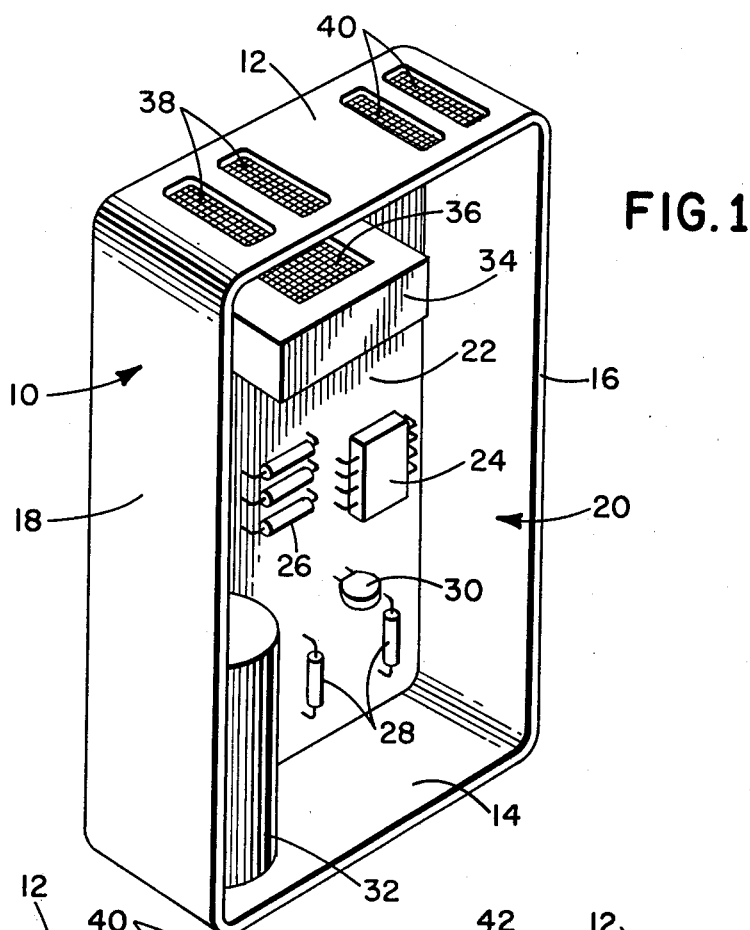
FIG. 1 is a perspective view of a portable receiver with one wall removed to illustrate the interior of the receiver housing.

A pager beeper assembly constructed in accordance with the present invention, with one wall thereof removed for purposes of illustration, is shown in FIG. 1. The beeper assembly includes a housing 10 which is substantially rectangular in shape. The housing 10 includes two relatively short side walls 12, 14 and two relatively long side walls 16, 18 which together form a cavity 20 in the interior of the housing 10. It will be apparent to those of ordinary skill that housings having shapes other than the illustrated shape can be used in the context of the present invention.

A printed circuit board 22 is located within the interior of the housing 10. The printed circuit board 22 supports a plurality of electrical components, such as an integrated circuit chip 24, resistors 26, 28 and a capacitor 30. These electrical components form a processing circuit which receives a transmitted data signal and converts the data signal into an electrical information signal. The processing circuit can be powered by means of an electrical battery 32. The electrical components illustrated in FIG. 1 are not intended to be representative of an actual receiver processing circuit, but are merely for purposes of illustration.

The electrical information signal produced by the receiver processing circuit is fed to a sound transducer 34 which converts the electrical signal into an audio output signal. The sound transducer 34 produces audio signals in a predetermined frequency range. For example, in the illustrated embodiment of a pager beeper, the audio output signals can be in the range of 2050 to 2150 cycles per second. The sound transducer 34 has an output port 36 through which the audio output signals are emitted.

One of the relatively short side walls 12 of the housing 10 includes a plurality of vents 38, 40 which permit the audio output signals produced by the sound transducer 34 to pass freely to the exterior of the housing 10. A piece of fabric can be placed over each of the vents 38, 40 on the interior side thereof to prevent dust from entering into the interior of the housing 10.

In a conventional prior art receiver, the output port 36 of the sound transducer 34 is directly coupled to an output aperture or apertures in a wall of the housing 10. This direct coupling may be provided by means of a plurality of walls forming a hollow channel between the output port 36 of the sound transducer 34 and the output aperture in the wall of the housing. The hollow channel conducts the audio output signals directly from the output port 36 to the output aperture without allowing them to pass into the interior of the housing 10.

In accordance with the present invention, however, the audio output signals from the sound transducer 34 are not conducted directly from the output port 36 of the sound transducer 34 to the vents 38, 40. Rather, the output port 36 of the sound transducer 34 is open to the interior cavity 20 of the housing 10 so that the audio output signals are emitted into the interior of the housing 10. By emitting its output signals into the interior of the housing 10, the sound transducer 34 is acoustically coupled to the housing cavity 20. The resonant frequency of the housing is typically much lower than the frequency range of the audio output signals from the sound transducer 34. Therefore, the housing 10 acts as a large capacitance which attenuates the output signal from the sound transducer 34.

Further in accordance with the present invention, the resonant frequency of the housing 10 is matched with the frequency range of the output signals from the sound transducer so that the resonant frequency of the housing 10 lies approximately at the center of the frequency range, e.g., 2100 cycles per second in the illustrated embodiment. This frequency matching is accomplished by dimensioning the plurality of vents 38, 40 in the walls of the housing 10 so that the resonant frequency of the housing 10 is at the desired frequency, e.g., at the center of the output frequency range. By acoustically coupling the sound transducer 34 to the cavity 20 of the housing 10 and venting the housing 10 so that its resonant frequency lies within the frequency range of the output signals from the sound transducer 34, the housing 10 operates as an acoustical amplifier which will increase the sound pressure level of the audio output signals from the sound transducer 34 without requiring a supply of additional electrical power and additional mechanical or electrical components to provide the desired increase.

The proper dimensioning of the vents 38, 40 in the wall 12 of the housing 10 will be achieved through empirical methods. It will be apparent to those of ordinary skill in the art that the number, shape, size and weight of the components contained within the interior of the housing 10, as well as the dimensions and material makeup of the housing 10, are all factors which contribute in establishing the resonant frequency of the housing 10. Due to the multiplicity of factors, it is not possible to provide a single formula which will quickly and easily enable one to determine the proper size, shape and location of the vents to achieve the desired result. Once the above-mentioned factors have been established in the design of the receiver, the dimensions and location of the vents 38, 40 which will produce the desired resonant frequency can be determined through empirical testing.

In one embodiment of a portable pager assembly incorporating the present invention, the housing 10 has a length of 3.125 inches, a width of 1.937 inches and a depth of 0.875 inch. The side walls of the housing 10 are 0.10 inch thick. Each of the four vents 38, 40 in the side wall 12 of the housing 10 is 0.470 inch long and 0.082 inch wide to establish the desired resonant frequency of the housing 10. As noted previously, it will be apparent that the number and dimensions of the vents will be dependent upon the size and shape of the components within the housing 10 and the material which is used to construct the housing as well as the dimensions of the housing itself.

Figures 2, 3:
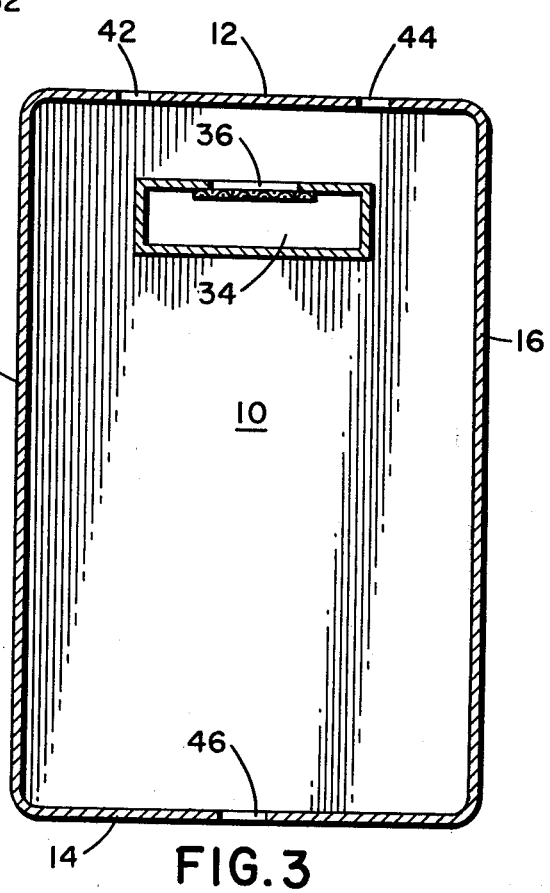
FIG. 2 is a longitudinal sectional view of a portable receiver illustrating a first embodiment of the present invention.
FIG. 3 is a longitudinal sectional view of a receiver illustrating a second embodiment of the present invention.

A cross-sectional view of the housing 10 illustrating one embodiment of the present invention is shown in FIG. 2. The transducer 34 is located within the interior of the housing 10 closer to one of the relatively short walls 12 than the other of the relatively short walls 14 which form the substantially rectangular shaped housing. The audio output signals produced by the sound transducer 34 are emitted through the output port 36 of the sound transducer and into the interior of the housing 10. In the illustrated embodiment, the nearer wall 12 of the two relatively short walls 12, 14 has four vents 38, 40 located therein. The other relatively short wall 14 and the two relatively long walls 16, 18 have no vents therein. As described previously, the vents 38, 40 are dimensioned so as to match the resonant frequency of the housing 10 with the output frequency range of the sound transducer 34. In this illustrated embodiment, the housing 10 operates as a Helmholtz resonator to acoustically amplify the audio output signals from the sound transducer 34.

A second embodiment of a receiver constructed in accordance with the present invention is illustrated in FIG. 3. As in the embodiment of FIG. 2, the sound transducer 34 is located closer to one of the relatively short walls 12 than the other of the relatively short walls 14 and the output signals from the sound transducer 34 are emitted into the interior of the housing 10. In this embodiment, however, only two vents 42, 44 are provided in the nearer wall 12 of the two relatively short walls. A vent 46 is also provided in the other relatively short wall 14. Both of the relatively long walls 16, 18 are solid. In this illustrated embodiment, the housing 10 operates as a tuned pipe which is open at both ends and which acoustically amplifies the audio output signals from the sound transducer 34. The three vents 42, 44, 46 are dimensioned so as to match the resonant frequency of the housing 10 with the output frequency range of the sound transducer 34.

From the foregoing, it will be apparent to those of ordinary skill in art that a variety of combinations of numbers and locations of properly dimensioned vents can be used to provide a receiver housing having a resonant frequency which enables the housing to operate as an acoustical amplifier for the audio output signals of a sound transducer.

A graph illustrating the sound pressure level (SPL) vs. frequency for a transducer in a variety of different environments is illustrated in FIG. 4. The sound pressure level of the audio output signal from a transducer is represented by the solid line. It can be seen that a conventional transducer, such as a beeper resonator commonly used in pagers, produces an audio output signal having a sound pressure level of 74–76 dB in the frequency range from 2050 to 2150 Hz. By placing the transducer in an acoustical cavity assembly, the sound pressure level of the audio output signal from the transducer can be raised to 82–84 dB in the desired frequency range, as illustrated by the dashed line in FIG. 4.

When the transducer and acoustical cavity assembly are assembled in a pager receiver housing and directly connected to the output aperture of the housing, as conventionally done in the prior art, the sound pressure level of the audio output signal is approximately the same as the transducer and acoustical cavity assembly when operating alone. When the transducer and acoustical cavity assembly are acoustically coupled to the housing cavity, the sound pressure level of the audio output signal can be attenuated by up to 3 decibels, as illustrated by the dotted line in FIG. 4. This attenuation of the output signal is due to the relatively low resonant frequency of the standard pager housing. However, when the transducer is acoustically coupled to the housing cavity, i.e., the audio output signals from the sound transducer are emitted into the interior of the housing, and the housing is vented or otherwise configured so that its resonant frequency lies within the output frequency range of the sound transducer, the sound pressure level of the audio output signal can be amplified substantially. As represented in FIG. 4 by the dot and dash line, the audio output signal has a sound pressure level of 91 decibels at the desired center frequency of 2100 Hz, without requiring additional electrical input power or additional components in the pager.

From the foregoing, it can be seen that acoustically coupling a sound transducer to the interior cavity of a receiver housing and venting or otherwise configuring the housing so that its resonant frequency lies within the desired output frequency range of the sound transducer, in accordance with the present invention, substantially increases the sound pressure level of the audio output signal from a receiver without requiring additional electrical power or components. This matching of housing resonant frequency to the desired frequency range may, of course, be accomplished by modifying the size of the housing itself or by the use of partitions internal of the housing to either close off a portion thereof or to create multiple connecting cavities.

The present invention may be embodied in other specific forms without departing from the spirit or essential characteristics thereof. The presently disclosed embodiments are therefore considered in all respects as illustrative and not restrictive. The scope of the invention is indicated by the appended claims rather than the foregoing description, and all changes which come within the meaning and range of equivalency of the claims are therefore intended to be embraced therein.

What is claimed is:

1. In a receiver apparatus having a housing forming a cavity and a sound producing device located within the interior of said housing for producing audio output signals in a predetermined frequency range, the improvement wherein said sound producing device is positioned within said housing so as to emit the audio output signals into said cavity rather than directly to the exterior of said housing to thereby acoustically couple said sound producing device to said cavity, said housing being vented or otherwise configured so that the resonant frequency of said housing lies within said predetermined frequency range to thereby acoustically amplify said audio output signals without requiring electrical power for said amplification.

2. A portable receiver in which the audio output signal produced thereby is acoustically amplified without requiring additional components or a supply of electrical power for amplification, comprising:
   a receiver housing having a cavity therein;
   means located with the interior of said housing for introducing audio output signals in a predetermined frequency range into said cavity, to thereby acoustically couple said audio output signals to said cavity; and
   said housing, being vented so that the resonant frequency of said housing lies approximately in the center of said predetermined frequency range to thereby cause said housing to operate as a tuned resonator for acoustically amplifying the audio output signals from said audio signal introducing means.

3. The portable receiver of claim 2 wherein said housing is substantially rectangular in shape, having two relatively long walls and two relatively short walls, and said audio signal introducing means is located in the interior of said housing at a position nearer to one of said relatively short walls than the other relatively short wall, further wherein the relatively short wall which is nearer to said audio signal producing means is vented.

4. The portable receiver of claim 3 further wherein the other of said two relatively short walls is vented so that said housing operates as a tuned pipe resonator open at both ends.

5. The portable receiver of claim 3 wherein a plurality of vents are located in said near wall.

6. In a receiver apparatus having a housing and a sound producing device for producing audio signals within a predetermined frequency range, the method of acoustically amplifying the audio output signal from said apparatus without requiring electrical power for said amplification, comprising the steps of:
   acoustically coupling the entire audio output of said sound producing device to a cavity within said housing; and
   matching the resonant frequency of said housing with said predetermined frequency range, whereby said housing operates as an acoustical amplifier for the audio output signals of said sound producing device.

7. The method of claim 6 wherein the step of acoustically coupling includes positioning said sound producing device within the interior of said housing so that the audio output signals are emitted into said cavity.

8. The method of claim 6 wherein the step of matching the resonant frequency includes providing a vent in said housing, said vent being dimensioned so as to establish the resonant frequency of said housing at a frequency within said predetermined frequency range.

9. The method of claim 6 wherein the step of matching the resonant frequency includes providing a plurality of vents in said housing which are dimensioned so as to establish the resonant frequency of said housing at a frequency within said predetermined frequency range.

10. The method of claim 6 wherein the step of matching the resonant frequency includes the step of modifying the effective dimensions of the portion of the housing in which the transducer is located.

11. A receiver comprising:

a housing containing a processing circuit for receiving a transmitted data signal and converting the data signal into an electrical signal;

a transducer for transforming the electrical signal into an audio signal in a predetermined frequency range and for emitting said audio signal into the interior of said housing; and means for establishing the resonant frequency of said housing at a value which lies within said predetermined frequency range.

12. The receiver of claim 10 wherein said establishing means is a vent in said housing which is dimensioned so as to provide a resonant frequency which lies within said predetermined frequency range.

* * * * *

UNITED STATES PATENT AND TRADEMARK OFFICE
CERTIFICATE OF CORRECTION

PATENT NO. : 4,268,718
DATED : May 19, 1981
INVENTOR(S) : Hamilton Clark, Jr.

It is certified that error appears in the above—identified patent and that said Letters Patent is hereby corrected as shown below:

On the title page, Item /22/ "Sep. 5, 1979" should read

--- July 10, 1979 ---.

Signed and Sealed this

Eighth Day of September 1981

[SEAL]

Attest:

Attesting Officer

GERALD J. MOSSINGHOFF

Commissioner of Patents and Trademarks